United States Patent
Dahle

(10) Patent No.: US 10,772,467 B2
(45) Date of Patent: Sep. 15, 2020

(54) COOKING STATION AND SYSTEM WITH REMOVABLE INSERT HAVING MULTIPLE COOKING MODES

(71) Applicant: North Atlantic Imports, LLC, Logan, UT (US)

(72) Inventor: Roger Dahle, Providence, UT (US)

(73) Assignee: North Atlantic Imports, LLC, Logan, UT (US)

( * ) Notice: Subject to any disclaimer, the term of this patent is extended or adjusted under 35 U.S.C. 154(b) by 115 days.

(21) Appl. No.: 15/971,976

(22) Filed: May 4, 2018

(65) Prior Publication Data

US 2018/0317707 A1 Nov. 8, 2018

Related U.S. Application Data

(60) Provisional application No. 62/503,156, filed on May 8, 2017.

(51) Int. Cl.
*A47J 37/07* (2006.01)

(52) U.S. Cl.
CPC ....... *A47J 37/0727* (2013.01); *A47J 37/0713* (2013.01); *A47J 37/0786* (2013.01); *A47J 2037/0795* (2013.01)

(58) Field of Classification Search
CPC ............ A47J 2037/0795; A47J 37/0713; A47J 37/0727; A47J 37/0786
See application file for complete search history.

(56) References Cited

U.S. PATENT DOCUMENTS

| 2,743,984 | A | * | 5/1956 | Guthrie | ................ | A47B 88/944 |
| | | | | | | 312/317.2 |
| 3,529,536 | A | | 9/1970 | Milhem | | |
| 3,688,757 | A | * | 9/1972 | Dusek | ................ | A47J 37/0763 |
| | | | | | | 126/9 R |
| 4,823,684 | A | | 4/1989 | Traeger et al. | | |
| 5,183,028 | A | | 2/1993 | Traeger et al. | | |
| 5,251,607 | A | | 10/1993 | Traeger et al. | | |
| 5,711,209 | A | | 1/1998 | Guines | | |
| 5,719,377 | A | | 2/1998 | Giebel et al. | | |
| 6,000,389 | A | * | 12/1999 | Alpert | ................ | A47J 37/0713 |
| | | | | | | 126/25 R |
| 6,189,528 | B1 | | 2/2001 | Oliver | | |
| 6,321,741 | B1 | * | 11/2001 | Thompson | .......... | A47J 37/0772 |
| | | | | | | 126/25 A |

(Continued)

*Primary Examiner* — Jorge A Pereiro
*Assistant Examiner* — Logan P Jones
(74) *Attorney, Agent, or Firm* — David L. Stott

(57) ABSTRACT

Embodiments of a cooking station for cooking a food product are provided. In one embodiment, the cooking station includes a main body and an insert. The main body includes a vertically extending wall extending between a closed bottom end and a closable upper end with a lid. The main body is configured to extend longitudinally in a vertical orientation. The main body defines a lower insert opening and an upper insert opening, the main body including a slideable door moveable to close-off either the lower and upper insert openings. The insert is sized and configured to be removably positioned through either one of the lower insert opening and the upper insert opening, the first insert having heating element container structure configured to deliver heat to the food product.

20 Claims, 6 Drawing Sheets

(56) References Cited

U.S. PATENT DOCUMENTS

| | | | |
|---|---|---|---|
| 6,705,307 B2 * | 3/2004 | Alden | A47J 37/0713 126/41 R |
| 6,820,538 B2 | 11/2004 | Roescher | |
| 6,874,496 B2 | 4/2005 | Waits et al. | |
| D577,945 S | 10/2008 | Traeger et al. | |
| 7,517,371 B2 | 4/2009 | Traeger et al. | |
| 7,832,390 B2 * | 11/2010 | Hsu | F24C 3/14 126/25 R |
| 7,959,692 B1 | 6/2011 | Traeger et al. | |
| 8,328,884 B1 | 12/2012 | Traeger et al. | |
| 8,490,614 B1 * | 7/2013 | Gregory | A47J 37/0754 126/1 R |
| 8,919,334 B2 | 12/2014 | Glanville et al. | |
| D760,539 S | 7/2016 | Colston | |
| 9,788,688 B1 | 10/2017 | Ficarra | |
| 10,285,540 B1 * | 5/2019 | Miller | A47J 37/1276 |
| 2004/0112226 A1 * | 6/2004 | Johnston | A47J 37/0704 99/339 |
| 2004/0118393 A1 * | 6/2004 | Schulte | A47J 37/0704 126/25 R |
| 2005/0028803 A1 * | 2/2005 | Jiang | A47J 37/0731 126/25 A |
| 2006/0075905 A1 | 4/2006 | Shih | |
| 2007/0137634 A1 | 6/2007 | Traeger et al. | |
| 2008/0257334 A1 * | 10/2008 | Brunner | A47J 37/0713 126/39 R |
| 2012/0247448 A1 * | 10/2012 | Thibodeaux | A47J 37/07 126/25 R |
| 2014/0287119 A1 * | 9/2014 | Dahle | F24C 15/16 426/520 |
| 2015/0144238 A1 | 5/2015 | Traeger | |
| 2017/0065124 A1 | 3/2017 | Colston | |
| 2017/0067649 A1 | 3/2017 | Colston | |
| 2017/0105573 A1 * | 4/2017 | Atkisson | A47J 37/07 |
| 2017/0367533 A1 * | 12/2017 | Ebersold | A47J 37/0704 |

* cited by examiner

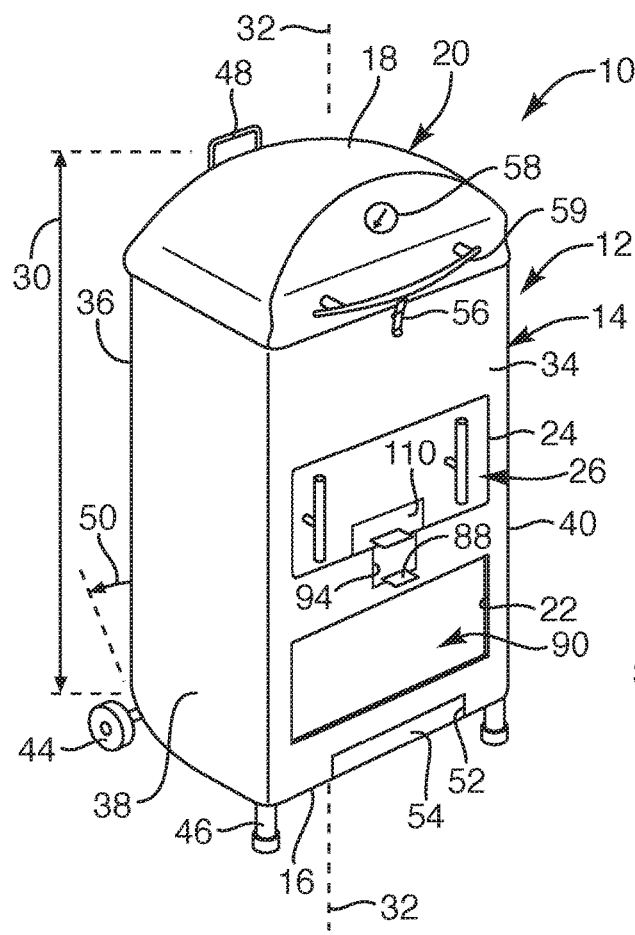
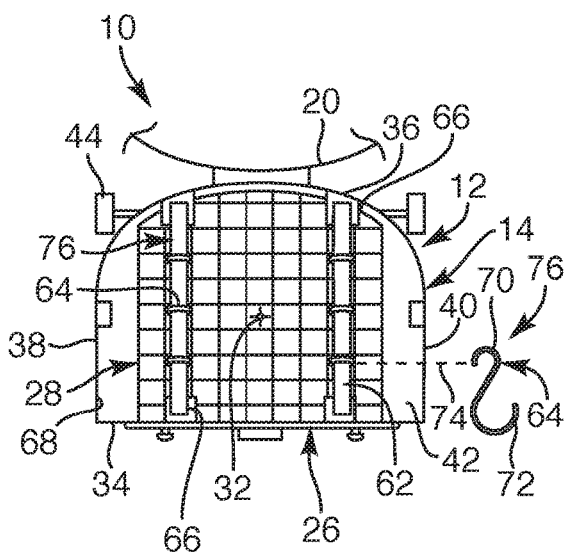
FIG. 1
FIG. 1A
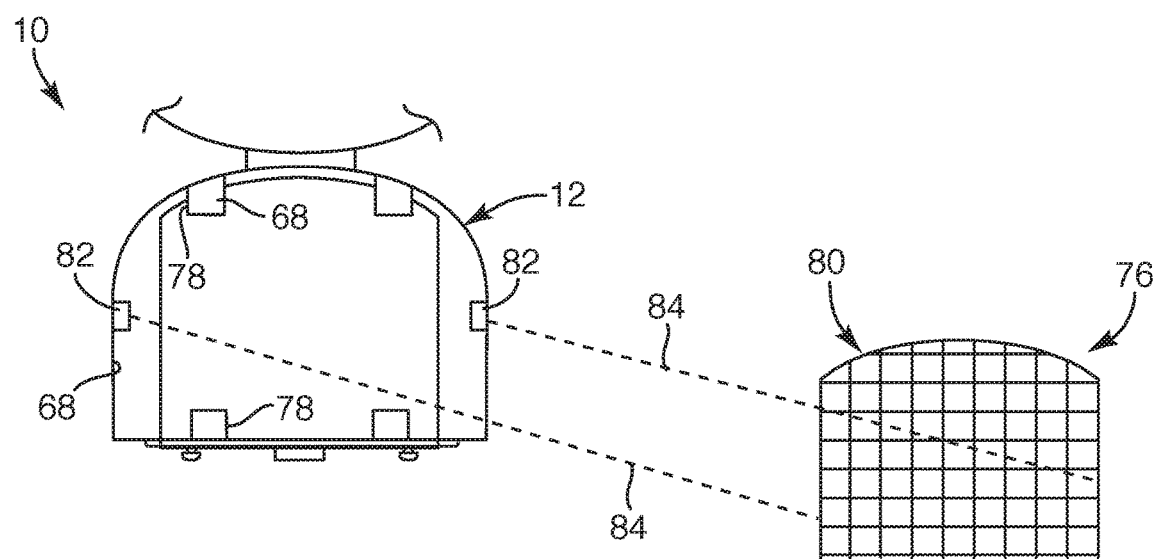
FIG. 1B

COOKING STATION AND SYSTEM WITH REMOVABLE INSERT HAVING MULTIPLE COOKING MODES

CROSS-REFERENCE TO RELATED APPLICATIONS

This application claims the benefit of U.S. Provisional Application No. 62/503,156, filed May 8, 2017, the disclosure of which is hereby incorporated by reference in its entirety.

TECHNICAL FIELD

The present invention relates generally to cooking stations and, more specifically, the present invention relates to a cooking station with a removable insert having various modes for cooking food.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Smoking and simmering the food with heat over a long period is also a desired mode for cooking the food to provide a particular taste imparted to the food. As such, it would be advantageous to provide a single cooking station that is able to barbeque food with various cooking modes so that the user can better select the outcome of the cooked food and obtain the unique flavors and textures imparted to food from the barbequing process.

BRIEF SUMMARY OF THE INVENTION

The present invention is directed to various embodiments of a cooking station and system for cooking a food product. In one embodiment, the present invention is directed to a cooking station having a main body and an insert. The main body includes a vertically extending wall extending between a closed bottom end and a pivotable lid at an upper end, the vertically extending wall extending laterally with a radial portion and a generally flat portion. The flat portion extends along a front side of the main body, the main body defining a first insert opening and a second insert opening therein. The first insert opening being positioned at a lower portion of the main body and the second insert opening being positioned above the first insert opening of the main body. The insert is sized to be removably positioned through either one of the first insert opening and the second insert opening, the insert having heating element structure configured to deliver heat to the food product.

In one embodiment, the heating element structure includes gas heating element structure for cooking the food product. In another embodiment, the heating element structure includes container structure sized and configured to hold a burnable material for cooking the food product. In a further embodiment, the container structure of the insert includes openings defined therein at an upper end portion of the container structure such that the container structure is configured to be partially positioned through the first insert opening so that the openings are exposed within the main body. In another embodiment, the insert is positionable in the first insert opening in a first position and a second position for cooking the food product, the insert, in the first position, being partially inserted within the first insert opening and, the insert, in the second position, being fully inserted within the first insert opening. In yet another embodiment, the main body includes a single slideable door moveable between the first insert opening and the second insert opening, the slideable door configured to close-off one of the first and second insert openings.

In another embodiment, the main body includes a ledge sized to hold a removable grill such that the grill is positionable above the second insert opening. In still another embodiment, cooking station further includes one or more food suspension elements sized to extend horizontally across an upper portion of the main body, the one or more food suspension elements configured to suspend removeable hook elements for suspending the food product thereto. In another embodiment, the main body includes two wheels and a handle each positioned on a single side of the main body, the handle positioned at an upper portion of the main body, the two wheels and the handle configured to facilitate manually tilting the main body to facilitate portability of the main body.

In accordance with another embodiment of the present invention, a cooking station for cooking a food product is provided. The cooking station includes a main body and an insert. The main body includes a vertically extending wall extending between a closed bottom end and a pivotable lid at an upper end, the main body configured to extend longitudinally in a vertical orientation. The main body defines a first insert opening and a second insert opening therein, the first insert opening being positioned at a lower portion of the main body and the second insert opening being positioned at an intermediate portion of the main body. The insert is sized to be removably positioned through either one of the first insert opening and the second insert opening, the insert having heating element structure configured to deliver heat to the food product.

In another embodiment, the main body includes rails extending horizontally within the main body to correspond with the first insert opening and the second insert opening such that the insert is configured to be manually moveable through one of the first and second insert openings and along the rails corresponding therewith. In another embodiment, the main body includes one or more ledges positioned adjacent an inner surface of the main body and along an upper portion of the main body, the one or more ledges sized and configured to support a grill.

In another embodiment, the heating element structure includes gas heating element structure for cooking the food product. In another embodiment, the heating element structure includes container structure sized and configured to hold charcoal for cooking the food product. In still another embodiment, the insert is positionable in the first insert opening in a first position and a second position for cooking the food product, the insert, in the first position, being partially inserted within the first insert opening and, the insert, in the second position, being fully inserted within the first insert opening.

In accordance with another embodiment of the present invention, a cooking station system for cooking a food product is provided. The cooking station system includes a main body and a first insert. The main body including a vertically extending wall extending between a closed bottom end and a closable upper end with a lid, the main body configured to extend longitudinally in a vertical orientation.

The main body defines a lower insert opening and an upper insert opening, the main body including a slideable door moveable to close-off either the lower and upper insert opening. The first insert is sized and configured to be removably positioned through either one of the lower insert opening and the upper insert opening, the first insert having heating element container structure configured to deliver heat to the food product. With this arrangement, the first insert is positionable in the lower insert opening in a first position and a second position for cooking the food product such that the first insert, in the first position, is partially inserted within the lower insert opening and such that the first insert, in the second position, is fully inserted within the lower insert opening.

In one embodiment, the heating element container structure of the insert includes openings defined therein at an upper end portion of the container structure such that, in the first position, the heating element container structure is configured to be partially positioned through the lower insert opening so that the openings are exposed within the main body. In another embodiment, upon the first insert being positioned in the lower insert opening in the first position, the first insert comprises a moveable brace to maintain the first insert at a level position. In still another embodiment, the cooking station further includes a second insert sized and configured to be removably positioned within the lower insert opening or the upper insert opening, the second insert having gas heating element structure configured for cooking the food product.

In another embodiment, the main body includes two wheels and a handle each positioned on a single side of the main body, the handle positioned at an upper portion of the main body, the two wheels and the handle configured to facilitate manually tilting the main body to facilitate portability of the main body. In another embodiment, the main body includes a ledge sized to hold a removable grill such that the grill is positionable above the second insert opening. In a further embodiment, the cooking station includes one or more food suspension elements sized to extend horizontally across an upper portion of the main body, the one or more food suspension elements configured to suspend removeable hook elements for suspending the food product thereto. In another embodiment, the main body includes rails extending horizontally within the main body to correspond with the lower insert opening and the upper insert opening such that the first insert is configured to be manually moveable through one of the first and second insert openings and along the rails corresponding therewith.

In accordance with another embodiment of the present invention, a cooking station system for cooking a food product. The cooking station includes a main body and a pellet hopper. The main body extends longitudinally in a vertical orientation with a vertically extending wall, the main body including a closed bottom end and closable upper end with a lid, the vertically extending wall extending laterally with a radial portion and a generally flat portion, the flat portion extending along a front side of the main body, the main body including multiple grill racks disposed horizontally within the main body and exposable with a pivoting door. The pellet hopper removably coupled to the main body, the pellet hopper configured to controllably feed pellets to a heating element within a lower portion of the main body, the pellet hopper extending longitudinally in a vertical orientation adjacent the main body.

In one embodiment, the cooking station system further includes one or more food suspension elements sized to extend horizontally across an upper portion of the main body, the one or more food suspension elements configured to suspend removeable hook elements for suspending the food product thereto. In another embodiment, the pellet hopper is controllable remotely. In another embodiment, the door includes a glass window for observation of the food product.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 1 is a perspective view of a cooking station, depicting an insert in an upper insert opening, according to one embodiment of the present invention;

FIG. 1A is a top view of the cooking station with a lid in an open position, depicting food suspension elements sized to receive hooks for positioning thereon, according to another embodiment of the present invention;

FIG. 1B is a exploded top view of the cooking station with the lid in the open position, depicting the cooking station sized to receive a grill, according to another embodiment of the present invention;

DETAILED DESCRIPTION OF THE INVENTION

Figure 2:
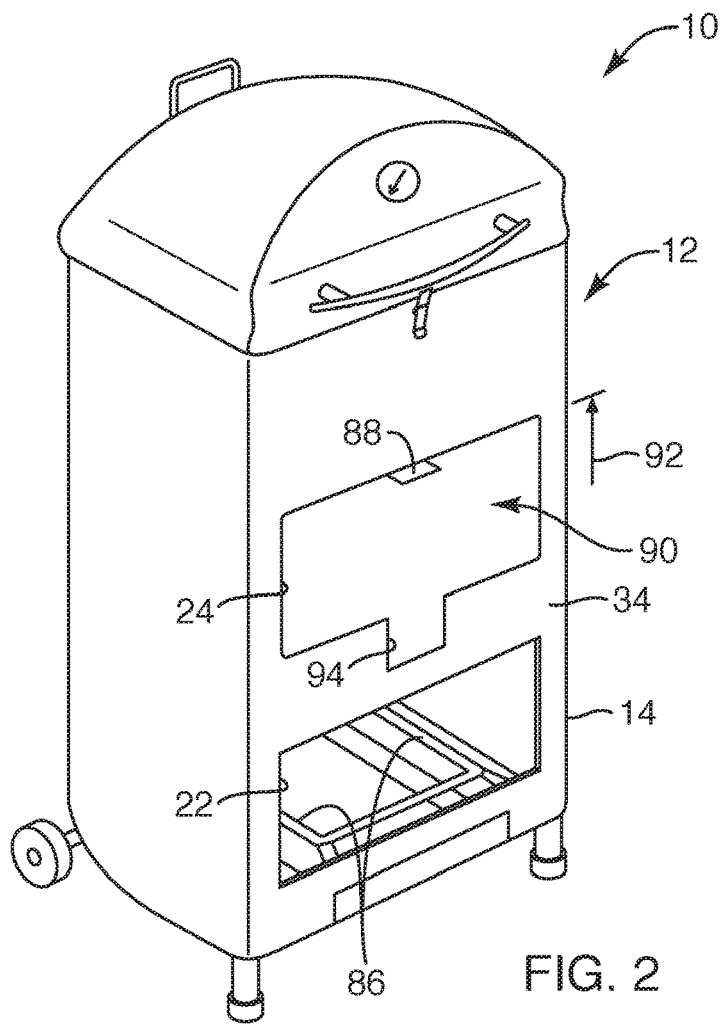
FIG. 2 is a perspective view of the cooking station with the insert removed therefrom, depicting a slidable door incorporated with the upper insert opening and a lower insert opening, according to another embodiment of the present invention.

Referring to FIGS. 1 and 1A, a cooking station 10 with multiple insert openings is provided. The cooking station 10 of the present invention may be sized and configured to facilitate various modalities for cooking a food product. In one embodiment, the cooking station 10 may include a main body 12 having an upright extending side wall 14 that may extend between a closed bottom end 16 and a pivotable lid 20 at an upper end 18. Such upright extending side wall 14 may define a lower insert opening 22 and an upper insert opening 24, each of which may receive an insert 26. The insert 26 may be removably positioned through either one of the lower insert opening 22 and the upper insert opening 24. With this arrangement, the insert may include heating element structure 28 configured to deliver heat to the food product.

The main body may include a longitudinal length 30 and extend along and define a longitudinal axis 32 of the main body 12. In the use position of the cooking station 10, the main body 12 may extend longitudinally so as to be employed in an upright or vertical orientation. The upright extending side wall 14 of the main body 12 may define a front wall 34, a rear wall 36, a first wall 38 and a second wall 40. The front wall 34 may extend in a generally flat manner and the rear wall 36 may extend laterally relative to the longitudinal axis 32 in a radial manner or with a radial component. The first and second walls 38, 40 may oppose each other and extend generally flat in a parallel manner. The main body 12 may also include a bottom wall 42 at the bottom end 16 of the main body 12, the bottom wall 42 defining a periphery that corresponds with the upright extending side wall 14. The main body 12 may also include wheels 44, such as two caster wheels, and/or legs 46, such as two legs, both of which may facilitate portability and stability of the cooking station. In one embodiment, the wheels 44 may extend between and along an axil or wheel axis adjacent the bottom end 16 at the rear of the main body 12 with the legs 46 extending from the bottom end 16 at the front of the main body 12. Further, the main body 12 may include a rear handle 48 at its rear-upper end to assist tilting the cooking station 10 to an angle 50 such that the cooking station 10 may be readily moveable to alternate locations, thereby, further facilitating portability of the cooking station 10. Further, at a lower end portion of the main body 12, the main body 12 may define a slot 52 for holding a grease tray 54 for collecting byproduct from cooking the food product. Such grease tray 54 may be linearly pulled and slid out from the slot 52 to clean, for example, subsequent to cooking the food product and then placed back within the slot 52.

The upper end 18 of the main body 12 may include the lid 20. In one embodiment, the lid 20 may pivot to move the lid 20 to closed and open positions over an upper portion of the upright extending side wall 14. Such lid 20 may include a front handle 59 for opening and closing the lid 20 relative to the main body 12. Further, the lid 20 may be secured to the main body 12 with a latch 56. The lid 20 may also include a temperature gauge 58.

With respect to FIG. 1A, in one embodiment, the cooking station 10 may include one or more food suspension elements 76 positioned at, for example, an upper portion of the upright side wall 14 of the main body 12. Such food suspension elements 76 may include rods 62 and/or hooks 64. The rods 62 may be suspended on a ledge or u-shaped members 66 that may be coupled to an inner surface 68 of the upright side wall 14. In this manner, the u-shaped members 66 may be oriented so that the rods 62 may be positioned over and suspended at the upper portion of the main body 12 with a portion of the u-shaped members 66 preventing lateral movement from the u-shaped members 66. The hooks 64 may be s-shaped hooks that each may include an upper hook portion 70 and a lower hook portion 72. The upper hook portion 70 may be positioned over the rods 62, as indicated by dashed line 74, such that the lower hook portion 72 may be employed for coupling and suspending food product thereto and within the main body 12. Upon cooking the food product, the rods 62 may be readily lifted from the u-shaped members 66 and removed from the hooks 64.

With respect to FIG. 1B, another embodiment of a food suspension element 76 for the cooking station 10 is provided. In this embodiment, the food suspension element 76 may be a grill 80. The grill 80 may be suspended within the upper portion of the main body 12 with an upper edge 78 of the u-shaped members 66. Further, the grill 80 may be positioned on additional ledges in the form of tabs 82, the tabs 82 being positioned against the inner surface 68 of the main body 12 at about the same horizontal plane or level as the upper edge 78 of the u-shaped members 66. In this manner, the grill 80 may be readily removed or positioned, as indicated by dashed lines 84, over the u-shaped members 66 and tabs 82 within the upper portion of the main body 12 to suspend and cook the food product thereon.

Now with reference to FIGS. 1 and 2, as previously set forth, the front wall 34 of the main body 12 may define the lower and upper insert openings 22, 24 (or otherwise referenced as first and second insert openings, respectively) of the cooking station 10. Such lower and upper insert openings 22, 24 may each include a set of rails 86 or a rail system, discussed in further detail herein, that extend within the main body 12 and correspond with the lower and upper insert openings 22, 24. Further, the lower insert opening 22 may be substantially similar to the upper insert opening 24 such that the insert 26 may be sized and configured to be inserted in either the lower or upper insert openings 22, 24. In one embodiment, the main body 12 may include a slidable door 90 sized to be linearly moveable, as indicated by arrow 92, to the opposite one of the lower and upper insert openings 22, 24 holding the insert 26. Such slidable door 90 may be linearly moveable in a direction parallel with the longitudinal axis 32, for example, between a lower position, as depicted in FIG. 1, and an upper position, as depicted in FIG. 2, by lifting up or pushing down on a door tab 88 directly coupled to and extending from the slidable door 90. In the lower position, the door tab 88 of the slideable door 90 may be exposed within a notch 94 defined in the front wall 34. Such slideable door 90 may be larger than the lower insert opening 22 and the upper insert opening 24. Further, the slideable door 90 may slide along an inner surface of the front wall 34 within, for example, a track or slot defined along the inner surface and may include structure, such as ribs or the like, for maintaining the slideable door 90 to the upper position with, for example, an interference fit.

Figure 3:
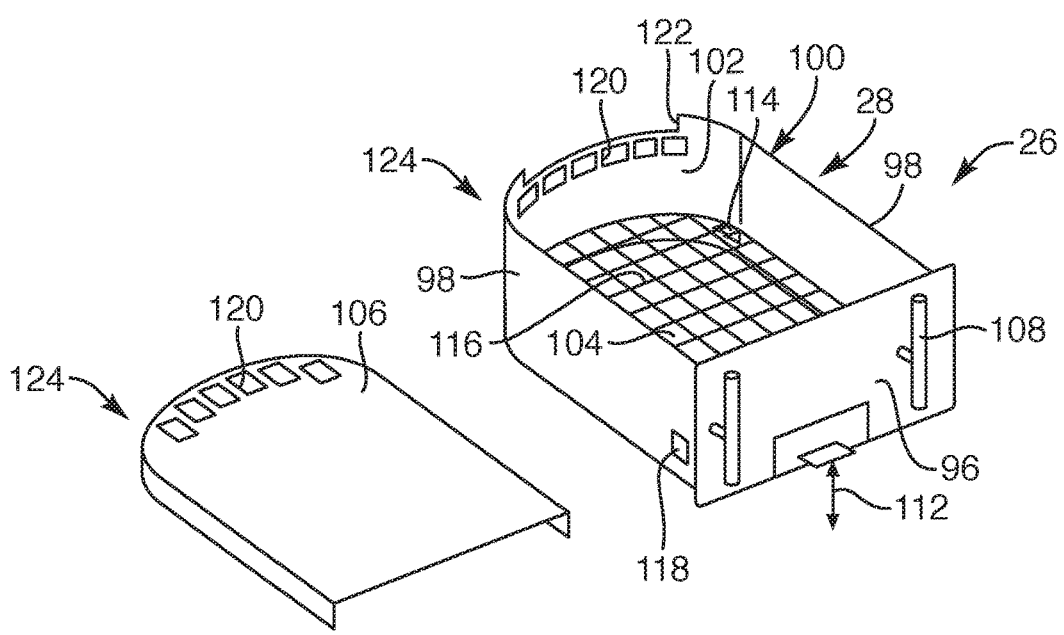
FIG. 3 is a perspective view of an insert, depicting the insert having a removable lid, according to another embodiment of the present invention.

Now with reference to FIGS. 2 and 3, the insert 26 may be sized and configured to be moveable within the exposed one of the lower and upper insert openings 22, 24. The insert 26 may also be referenced as a first insert. In one embodiment, the insert 26 may include a tray or drawer like structure. In another embodiment, as previously set forth, the insert 26 may include heating element structure 28 configured to deliver heat to a food product. For example, the heating element structure 28 of the insert 26 may define container structure 100 sized and configured to hold charcoal or other burnable element that may be ignited to burn and deliver heat to the food product. The container structure 100 may include a face wall 96, opposing side walls 98, a back wall 102, and a bottom wall 104. Further, the container structure 100 may include a removable lid 106. The face wall 96 may include one or more handles 108 and may include an adjustable door 110. The adjustable door 110 may be adjusted to define an air inlet within the face wall 96 such that the adjustable door 110 may be moved between a closed position to various sized open positions in a linearly slideable manner, as indicated by bi-linear arrow 112. The side walls 98 may include tabs 114 positioned a predetermined height from the bottom wall 104 and extend inward from the opposing side walls 98, the tabs 114 sized and configured to suspend a charcoal grate 116 between the side walls 98. Such charcoal grate 116 may also be pivotably coupled at pivot points 118 on opposing end portions of the side walls 98. The container structure 100 may also include through holes 120 defined in an upper end portion 124 of the container structure 100. For example, such through holes 120 may be defined in the back wall 102 and the lid 106 and a larger through hole or gap 122 defined between the back wall 102 and the lid 106, upon the lid 106 being positioned on the side walls 98 and back wall 102 of the container structure 100. Such through holes 120 may be positioned, sized and configured to deliver smoke from the container structure 100 and upward toward the food product. With this arrangement, the adjustable door 110 may be adjusted to a height to provide a desired air flow under the charcoal grate 116 and to charcoal in the container structure 100. Upon charcoal completing its burn, the insert 26 may be withdrawn from, for example, the lower insert opening 22, the lid 106 may be removed to then turn upside-down the insert 26 discard the charcoal residue and, if needed, the charcoal grate 116 may pivot outward to facilitate residue being discarded from below the charcoal grate 116.

Figure 4:
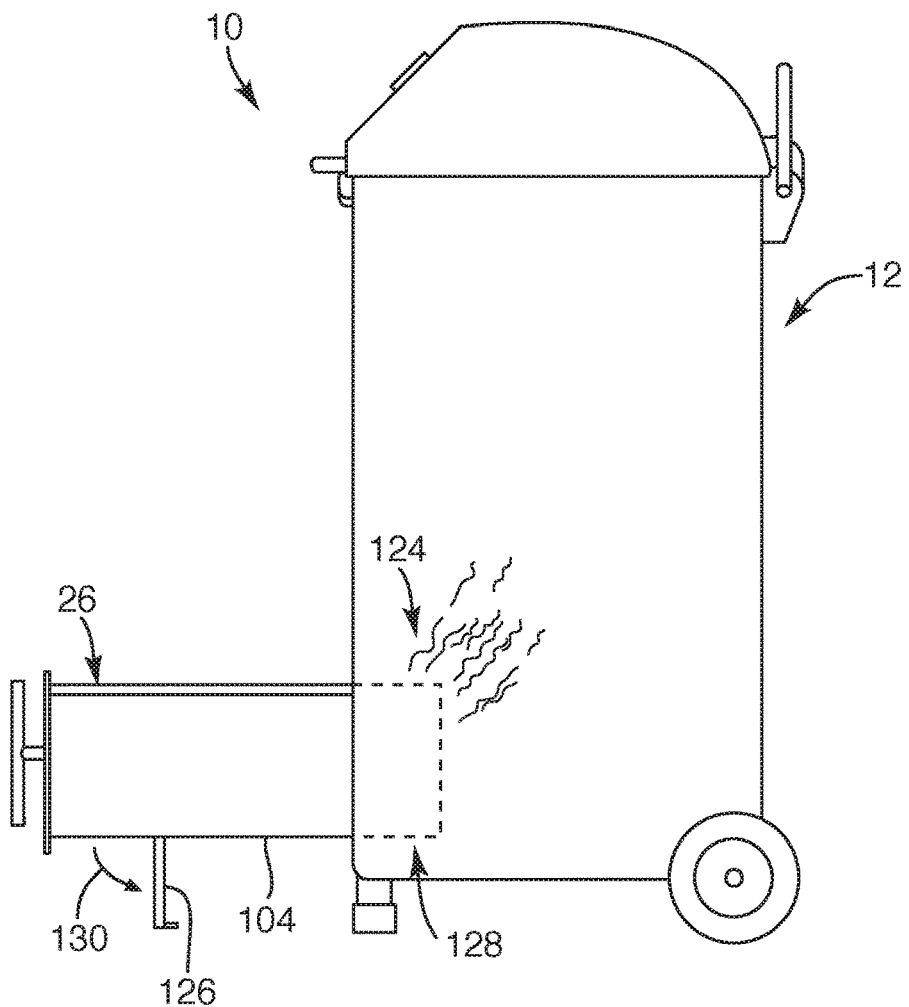
FIG. 4 is a side view of the cooking station, depicting the insert in an outer position, according to another embodiment of the present invention.
Figure 5:
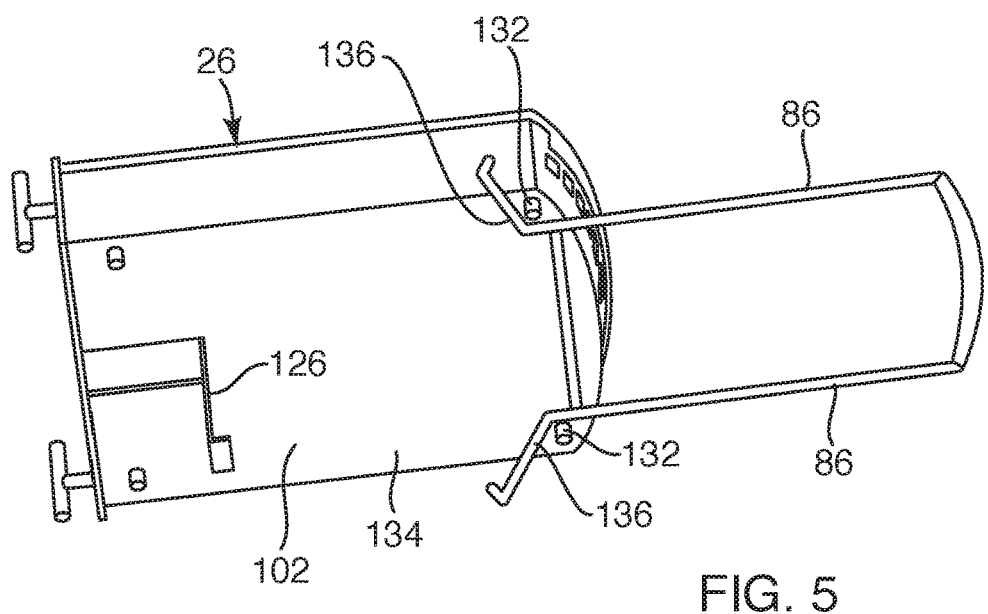
FIG. 5 is a bottom perspective view of the insert positioned relative to rails, according to another embodiment of the present invention.
Figure 6:
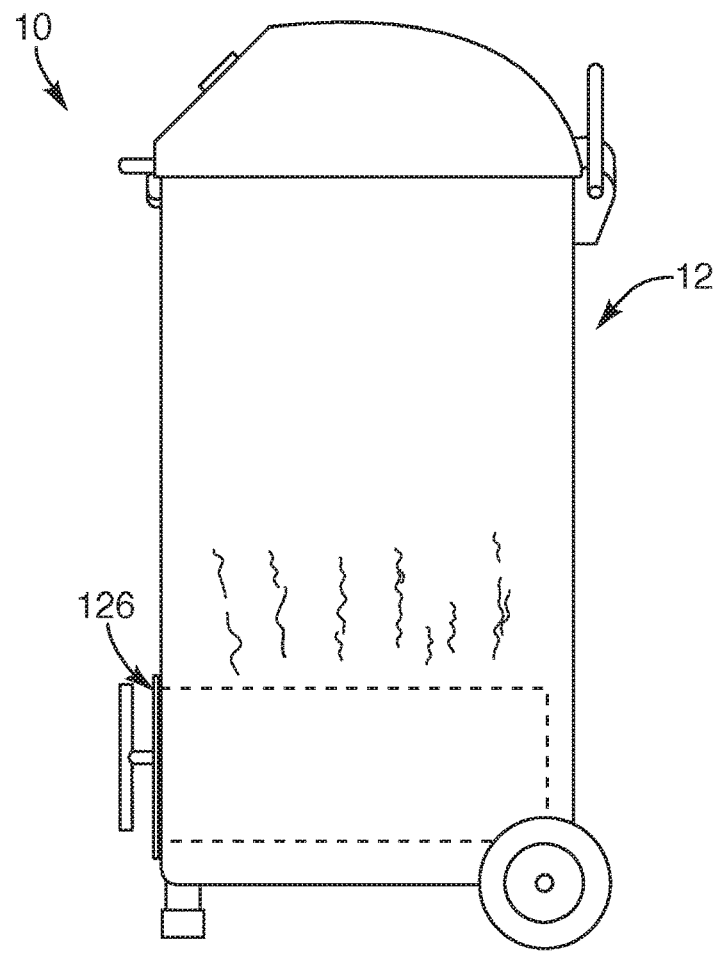
FIG. 6 is a side view of the cooking station, depicting the insert in an inner position, according to another embodiment of the present invention.

With reference to FIGS. 3, 4, and 6, the insert 26 may include multiple use positions within the lower insert opening 22 of the cooking station 10, such as a first position (FIG. 4) and a second position (FIG. 6). For example, for a slow smoker cook of the food product, the insert 26 may be positioned in a first position or partially inserted position within the lower insert opening, as depicted in FIG. 4. In the first position, an end portion 128 of the insert 26 may be disposed within the main body 12 so that the upper end portion 124 defining the through holes in the lid 106 and back wall 102 of the container structure 100 may deliver smoke to the food product. Further, in the first position, the container structure 100 may include a brace 126 or leg (see also, FIG. 5). In one embodiment, the brace 126 may be pivotably coupled to the bottom wall 104 such that the brace 126 is moveable from being disposed adjacent the bottom wall 104 to a use position, as indicated by arrow 130. The use position of the brace 126 may extend generally orthogonal relative to the bottom wall 104 of the container structure 100. In another embodiment, the insert 26 may be partially inserted, as depicted in FIG. 4, as well as various partially inserted positions that may be further inserted, but also partially inserted positions into the main body 12. In each of the partially inserted positions, it is preferred that the container structure 100 include the lid 106 thereon.

With respect to FIGS. 2, 4, and 5, the rails 86 may be suspended and/or secured to structure coupled to the inner surface of the main body 12. Such rails 86 may extend horizontally from and adjacent to a lower edge of each of the lower insert opening 22 and upper insert opening 24. Further, the rails 86 may be sized and configured to correspond with pegs 132 or legs or other stopping structure defined in an underside surface 134 of the bottom wall 102. For simplicity purposes, the rails 86 and a bottom side of the insert 26 are shown without the side wall 14 of the main body 12 in FIG. 5. As depicted, in one embodiment, the rails 86 may be disposed between opposing pegs 132 such that the insert 26 may be linearly slidable along the rails 86. Further, a bent portion 136 in the rails 86 may be employed to provide a hard stop for the insert 26 relative to the rails 86. This hard stop may be employed for the user to readily ascertain the first position of the insert 26, as depicted in FIG. 4. Upon removing the insert 26 from the lower insert opening 22, the user may slightly lift the insert 26 upward so that the pegs 132 gain clearance above the bent portion 136 of the rails 86.

With reference to FIGS. 2 and 6, the insert 26 may be moved to the second position within the lower insert opening 22 of the main body 12 of the cooking station 10. In the second position, the insert 26 may be fully inserted within the lower insert opening 22. In the second position, the insert may (or may not) include its lid 106 positioned over the insert 26. For example, including the lid 106 may provide a slower cook and disperse smoke from the through holes. In another embodiment, as desired by the user, the insert 26 may be placed in the second position within the lower insert opening 22 without the lid 106, which would fully expose the hot coals below the food product to increase the temperature in the cooking station 10 making for a faster cook of the food product.

With respect to FIGS. 1, 4 and 6, in another embodiment, the insert 26 may be positioned in the upper insert opening 24 with the slideable door 90 moved to close-off the lower insert opening 22. Similar to the insert 26 being positioned in the lower insert opening 22, the insert 26 may be positioned with or without the lid 106 of the insert 26 in the upper insert opening 24. In this manner, the insert 26 may be employed in various positions of the cooking station 10 to provide various levels of heating and/or smoking of the food product as well as being able to control the amount of air accessing the coals of the charcoal via the adjustable door 110 disposed on the insert 26 to, thereby, control the heat and/or smoke to the food product.

Figure 7:
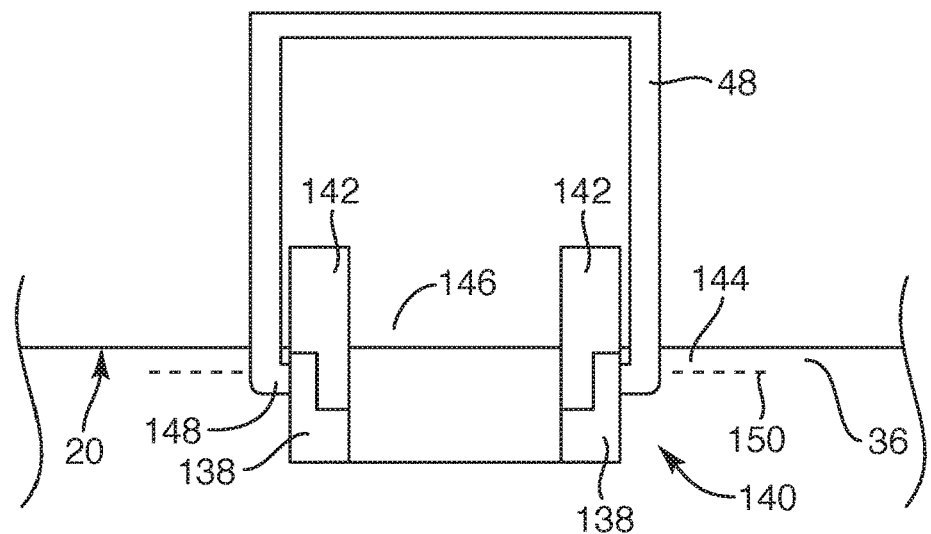
FIG. 7 is an enlarged rear view of the cooking station, depicting a hinge member coupled to a lid and main body of the cooking station and a handle associated with the hinge member, according to another embodiment of the present invention.

Now with reference to FIGS. 1 and 7, in another embodiment, the lid 20 of the cooking station 10 may be pivotable with a hinge member 140. The hinge member 140 may include a first hinge portion 138 and a second hinge portion 142. The first hinge portion 138 may be coupled to an upper end portion 144 of the rear wall 36 and the second hinge portion 142 may be coupled to a back side 146 of the lid 20, the first and the second hinge portions 138, 142 coupled together at a hinge axis 150. In one embodiment, the hinge member 140 may include the rear handle 48 that may be fixed thereto. In another embodiment, the hinge member 140 may include the rear handle 48 in a u-shaped configuration with bent ends 148 and held within the hinge axis 150. In another embodiment, the bent ends 148 of the u-shaped handle may be employed as pins coupling the hinge member 140 together and facilitating the lid 20 to pivot. In another embodiment, the rear handle 48 may be fixed (in a non-pivotable manner) to the hinge member 140. In another embodiment, the rear handle 48 may be pivotable about the hinge axis 150. With this arrangement, the rear handle 48 may be employed with the two rear wheels 44 of the cooking station 10 to gain leverage for tilting the cooking station 10 at the previously described angle 50 to, thereby, facilitate ready portability of the cooking station 10. Upon tilting the cooking station, it is preferred to secure the pivotable lid 20 to the main body 12 with the latch 56.

Figure 8:
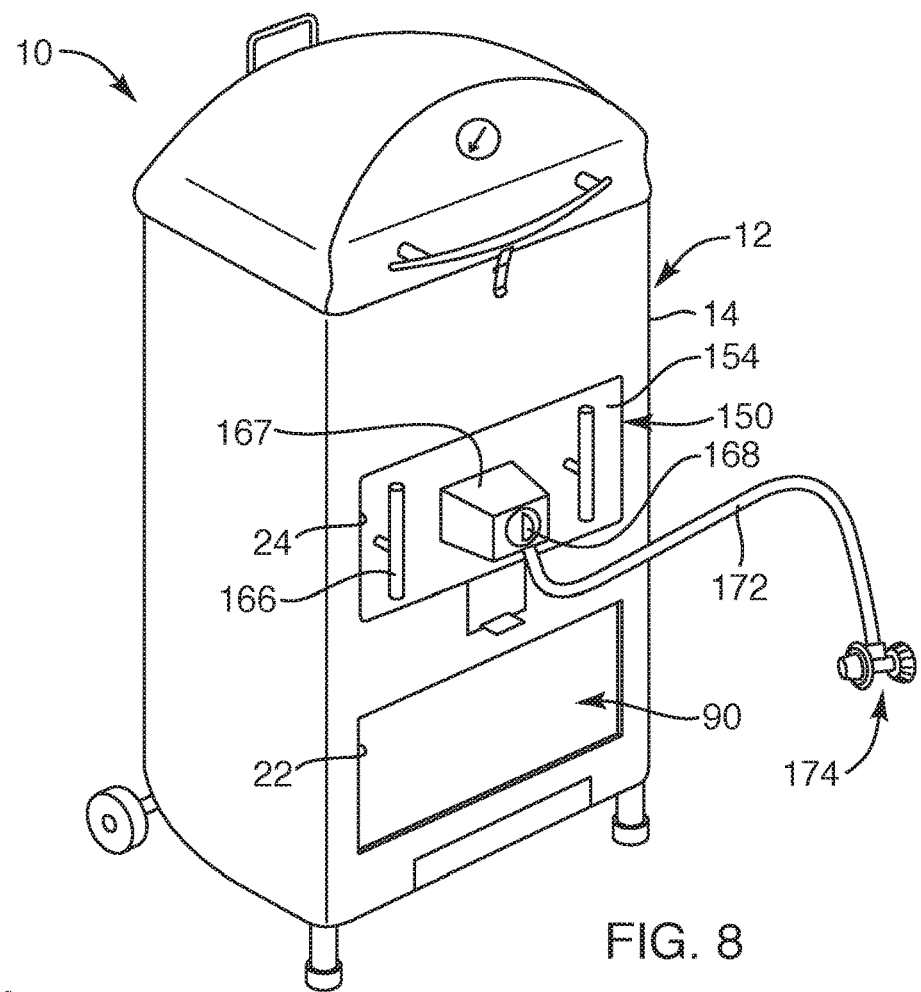
FIG. 8 is a perspective view of the cooking station, depicting a second insert with a gas burner, according to another embodiment of the present invention.
Figure 9:
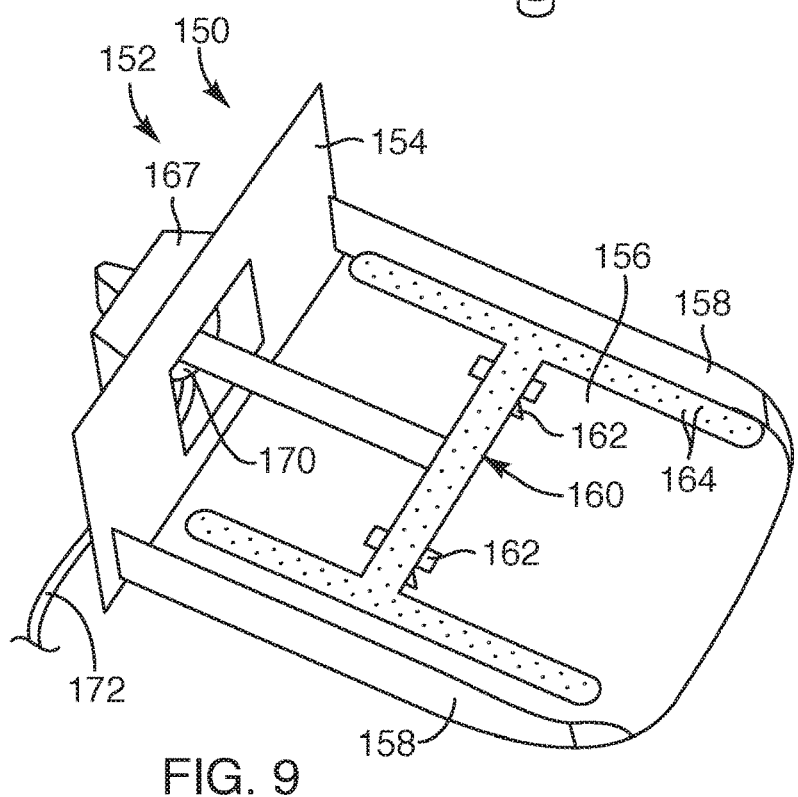
FIG. 9 is a perspective view of the second insert with the gas burner, according to another embodiment of the present invention.

With reference to FIGS. 8 and 9, in another embodiment, the cooking station 10 may include a second insert 150 (or an additional accessory insert) that may include heating element structure 152 therewith. In this embodiment, the heating element structure 152 may include gas heating element structure. For example, the second insert 150 may include a face wall 154, a bottom wall 156, and opposing side walls 158 to define a tray like structure or container like structure. Such tray like structure may be employed for catching grease as well as coupling a support structure 162 for a burner tube 160. The burner tube 160 may include various configurations, such as an H-shaped configuration or any other suitable configuration, such as a circular configuration. The burner tube 160 may be made of stainless steel and include holes 164 for dispersing gas therefrom. The face wall 154 may include guard structure 167, handles 166 and a burner knob 168, the burner knob 168 coupled to a valve 170 disposed within the guard structure 167 such that turning the burner knobs 168 may adjust the valve 170 to adjust the amount of gas being fed through the burner tube 160. The valve 170 also may be coupled to a hose 172 and a gas regulator 174 for coupling to a gas source (not shown), such as a propane tank or natural gas source. The second insert 150 may include other structure for operating a gas burner, such as an ignitor switch (not shown) or the like, or any other structure as known to one of ordinary skill in the art. The second insert 150 may be removably positioned in the lower insert opening 22 or the upper insert opening 24 defined in the side wall 14 of the main body 12, similar to the insert of the previous embodiment, depending upon the heat level desired for cooking the food product. As previously set forth, the slideable door 90 may be moved to the lower or upper insert openings 22, 24 to the opposite position of the selected second insert 150. Further, similar to the previous embodiment, the second insert 150 may include pegs (not shown) along an underside of the bottom wall 156 to assist in sliding the second insert 150 along the rails 86 (FIGS. 2 and 5) associated with the lower and upper insert openings 22, 24. With this arrangement, the user of the cooking station 10 may select various modalities for cooking a food product, heating with gas heat with the second insert 150 or heating and/or smoking the food product with the insert 26 (FIG. 1), as well as the user may select various positions for positioning the selected first or second inserts 26, 150 within the main body 12 to control the heat held within the cooking station to slow or speed-up the cooking process.

Figure 10:
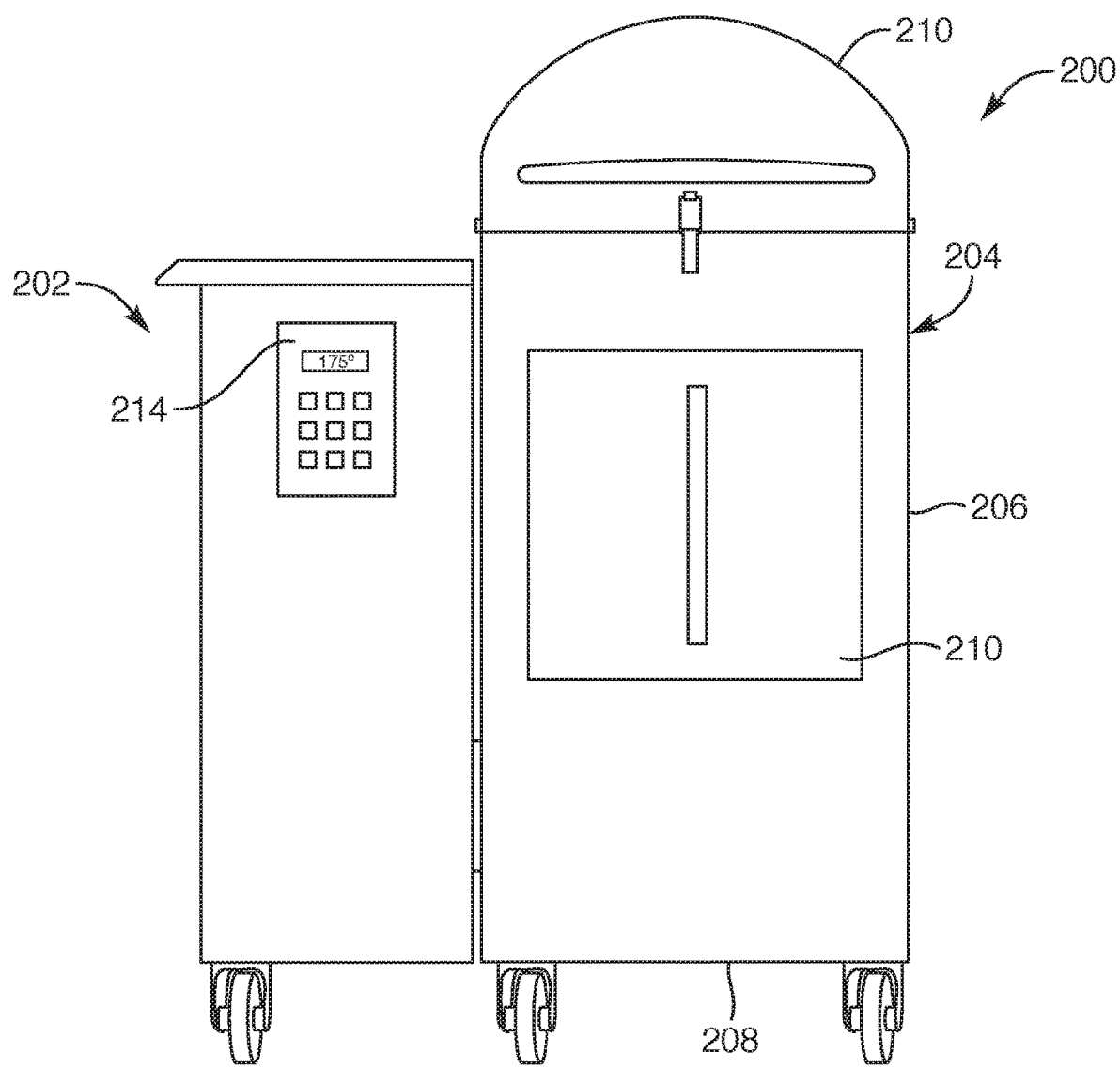
FIG. 10 is a front view of another embodiment of a cooking station integrated with a pellet hopper, according to another embodiment of the present invention.

Now with reference to FIG. 10, another embodiment for a cooking station 200 is provided. In this embodiment, the cooking station 200 may include a pellet hopper 202 coupled therewith. The cooking station 200 may extend longitudinally so as to be oriented longitudinally in a vertical manner or orientation, similar to the cooking station of the previous embodiment. The pellet hopper 202 may also extend longitudinally so as to be oriented longitudinally in a vertical manner. Further, the cooking station 200 may include a main body 204 defining an upright side wall 206 with a closed bottom end 208 and a pivotable lid 210, similar to the previous embodiment. Further, the upright wall 206 may extend laterally with a radial portion and a generally flat portion, the flat portion extending along a front side of the main body 204, similar to that described and depicted for the main body of previous embodiments. The cooking station 200 of this embodiment may include a door 212 that may be pivotably opened to expose multiple grill racks (not shown) positioned horizontally within the main body 204 of the cooking station 200 and spaced vertically at different heights within the main body 204. For example, the lid 210 may be pivoted open to expose a top grill rack (not shown), similar to the grill 80 in the embodiment set forth in FIG. 1A. Further, similar to that depicted in FIG. 1A, the lid 210 may be pivoted open to expose the food suspension elements 76, such as the rods 62 and the hooks 64. Each of such grill racks or food suspension elements 76 (see FIG. 1A) may be employed for positioning food thereon. In another embodiment, the door 212 of the cooking station 200 may be made of a transparent material, such as glass, configured to withstand high temperatures so that a user may view and observe the food product on the racks without opening the door 212 of the cooking station 200.

The pellet hopper 202 may include an auger (not shown) for controllably feeding pellets that may be heated to deliver heat and/or smoke to the food product within the cooking station 200. Such pellet hopper 202 may include typical pellet hopper structure, as known to one of ordinary skill in the art, for heating, smoking, and flavoring food product. Such pellet hopper 202 may include a control panel 214 operatively coupled to a control system and temperature sensors (not shown) within the main body 204 to control the temperature of the cooking station 200 with the amount of pellets being fed to a heating element (not shown) of the cooking station 200. In this manner, a user may control the temperature and the time period for cooking food product with the pellet hopper 202. Further, such temperature settings or other input options of the pellet hopper 202 may be controlled remotely through, for example, blue tooth and Wi-Fi technology or the like via application software downloadable to a user's smart phone, as known to one of ordinary skill in the art. In another embodiment, the pellet hopper 202 may be integrated with the cooking station 10 of the previous embodiment (e.g., FIG. 1) through, for example, a third insert opening, that may be defined in the first or second side walls 38, 40 of the main body 12 of the cooking station 10.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking station for cooking a food product, comprising:
   a main body having a vertically extending wall extending between a closed bottom end and a pivotable lid at an upper end, the vertically extending wall extending laterally with a radial portion and a generally flat portion, the flat portion extending along a front side of the main body, the main body defining a first insert opening and a second insert opening therein, the first insert opening being positioned at a lower portion of the main body and the second insert opening being positioned above the first insert opening of the main body, the front side of the main body including a door, the door vertically slidable along the front side of the main body to close-off either the first insert opening or the second insert opening; and
   an insert sized to be removably positioned through either one of the first insert opening and the second insert opening such that, upon the insert being positioned in the first insert opening, the door is vertically slidable to be positioned to close-off the second insert opening and, upon the insert being positioned in the second insert opening, the door is vertically slidable to be positioned to close-off the first insert opening, the insert having heating element structure configured to deliver heat to a food product.

2. The cooking station of claim 1, wherein the heating element structure comprises gas heating element structure for cooking the food product.

3. The cooking station of claim 1, wherein the heating element structure comprises container structure sized and configured to hold charcoal for cooking the food product.

4. The cooking station of claim 3, wherein the container structure of the insert comprises openings defined therein at an upper end portion of the container structure such that the container structure is configured to be partially positioned through the first insert opening so that the openings are exposed within the main body.

5. The cooking station of claim 1, wherein the insert is positionable in the first insert opening in a first position and a second position for cooking the food product, the insert, in the first position, being partially inserted within the first insert opening and, the insert, in the second position, being fully inserted within the first insert opening.

6. The cooking station of claim 1, wherein the main body comprises a ledge sized to hold a removable grill such that the grill is positionable above the second insert opening.

7. The cooking station of claim 1, further comprising one or more food suspension elements sized to extend horizontally across an upper portion of the main body, the one or more food suspension elements configured to suspend removeable hook elements for suspending the food product thereto.

8. The cooking station of claim 1, wherein the main body comprises two wheels and a handle each positioned on a single side of the main body, the handle positioned at an upper portion of the main body, the two wheels and the handle configured to facilitate manually tilting the main body to facilitate portability of the main body.

9. A cooking station system for cooking a food product, comprising:
a main body having a vertically extending wall extending between a closed bottom end and a closable upper end with a lid, the main body configured to extend longitudinally in a vertical orientation, the main body defining a lower insert opening and an upper insert opening, the main body including a slideable door vertically slideable and moveable to close-off either the lower and upper insert opening; and
a first insert sized and configured to be removably positioned through either one of the lower insert opening and the upper insert opening such that, upon the first insert being positioned in the lower insert opening, the slideable door is vertically slideable to be positioned to close-off the upper insert opening and, upon the first insert being positioned in the upper insert opening, the slideable door is vertically slideable to be positioned to close-off the lower insert opening, the first insert having heating element container structure configured to deliver heat to the food product;
wherein the first insert is positionable in the lower insert opening in a first position and a second position for cooking the food product such that the first insert, in the first position, is partially inserted within the lower insert opening and such that the first insert, in the second position, is fully inserted within the lower insert opening.

10. The cooking station system of claim 9, wherein the heating element container structure of the insert comprises openings defined therein at an upper end portion of the container structure such that, in the first position, the heating element container structure is configured to be partially positioned through the lower insert opening so that the openings are exposed within the main body.

11. The cooking station system of claim 9, wherein, upon the first insert being positioned in the lower insert opening in the first position, the first insert comprises a moveable brace to maintain the first insert in a level position.

12. The cooking station system of claim 9, further comprising a second insert sized and configured to be removably positioned within the lower insert opening or the upper insert opening, the second insert having gas heating element structure configured to cook the food product.

13. The cooking station system of claim 9, wherein the main body comprises two wheels and a handle each positioned on a single side of the main body, the handle positioned at an upper portion of the main body, the two wheels and the handle configured to facilitate manually tilting the main body to facilitate portability of the main body.

14. The cooking station system of claim 9, wherein the main body comprises a ledge sized to hold a removable grill such that the grill is positionable above the second insert opening.

15. The cooking station of claim 9, further comprising one or more food suspension elements sized to extend horizontally across an upper portion of the main body, the one or more food suspension elements configured to suspend removeable hook elements for suspending the food product thereto.

16. The cooking station of claim 9, wherein the main body includes rails extending horizontally within the main body to correspond with the lower insert opening and the upper insert opening such that the first insert is configured to be manually moveable through one of the first and second insert openings and along the rails corresponding therewith.

17. The cooking station of claim 1, wherein the door is independently moveable relative to the insert such that the door is a separate structure relative to the insert.

18. The cooking station of claim 1, wherein the insert comprises a removable lid positionable over an upper side of the insert.

19. The cooking station of claim 9, wherein the door is independently moveable relative to the first insert such that the door is a separate structure relative to the first insert.

20. The cooking station of claim 9, wherein the first insert comprises a removable lid positionable over an upper side of the first insert.

* * * * *